United States Patent [19]

Richmann et al.

[11] Patent Number: 5,302,242

[45] Date of Patent: * Apr. 12, 1994

[54] PROCESS AND COMPOSITION FOR DEINKING DRY TONER ELECTROSTATIC PRINTED WASTEPAPER

[75] Inventors: Sandra K. Richmann, Jacksonville Beach; Mary Beth Letscher, Jacksonville, both of Fla.

[73] Assignee: PaperChem Inc. Betz, Jacksonville, Fla.

[*] Notice: The portion of the term of this patent subsequent to Aug. 25, 2008 has been disclaimed.

[21] Appl. No.: 871,366

[22] Filed: Apr. 20, 1992

Related U.S. Application Data

[63] Continuation-in-part of Ser. No. 691,210, Apr. 25, 1991, Pat. No. 5,141,598.

[51] Int. Cl.$^5$ ............................................. D21C 5/02
[52] U.S. Cl. ................................................ 162/5; 162/4
[58] Field of Search ........................................... 162/4, 5

[56] References Cited

U.S. PATENT DOCUMENTS

| | | | |
|---|---|---|---|
| 3,501,373 | 3/1970 | Illingworth | 162/5 |
| 3,635,789 | 1/1972 | Green | 162/5 |
| 4,162,186 | 7/1979 | Wood et al. | 162/5 |
| 4,276,118 | 6/1981 | Quick | 162/5 |
| 4,518,459 | 5/1985 | Freis et al. | 162/5 |
| 4,561,933 | 12/1985 | Wood et al. | 162/5 |
| 4,666,558 | 5/1987 | Wood et al. | 162/5 |
| 4,820,379 | 4/1989 | Darlington | 162/5 |
| 5,102,500 | 4/1992 | Darlington | 162/5 |

FOREIGN PATENT DOCUMENTS

| | | | |
|---|---|---|---|
| 727506 | 2/1966 | Canada | 162/5 |
| 0307024 | 3/1989 | European Pat. Off. | |

OTHER PUBLICATIONS

Darlington, W. B., "A New Process for Deinking Electrostatic-Printed Secondary Fiber", *TAPPI Proceedings*, 1988 Pulping Conference, pp. 95–100.

*Primary Examiner*—Peter Chin
*Attorney, Agent, or Firm*—Alexander D. Ricci; Richard A. Paikoff

[57] ABSTRACT

A process and composition for deinking dry toner electrostatic printed wastepaper is disclosed. The composition comprises a combination of at least two of the following components: (a) aliphatic petroleum distillates, (b) an alkylphenoxypoly-(ethyleneoxy) ethanol and (c) an ethoxylated polyoxypropylene glycol.

The process comprises administering a sufficient amount of the composition to a sample of electrostatic printed wastepaper for which treatment is desired.

8 Claims, No Drawings

PROCESS AND COMPOSITION FOR DEINKING DRY TONER ELECTROSTATIC PRINTED WASTEPAPER

This application is a continuation-in-part of Ser. No. 07/691,210 filed April 25, 1991, now U.S. Pat. No. 5,141,598.

BACKGROUND OF THE INVENTION

Dry toner electrostatic printing inks, including laser and xerographic inks, are important and growing contaminants in the area of waste paper recycling. Traditionally, paper has been printed with water or oil-based inks which were adequately removed by conventional deinking procedures. In these methods, secondary fiber is mechanically pulped and contacted with an aqueous medium containing a surfactant. Ink is separated from pulp fibers as a result of mechanical pulping and the action of the surfactant. The dispersed ink is separated from pulp fibers by such means as washing or flotation.

Conventional deinking processes have shown minimal success in dealing with dry toner electrostatic printing inks, with the necessary chemical and mechanical treatments of the furnish proving to be time consuming and often rendering a furnish which is unacceptable for many applications. The development of a deinking program for office waste contaminated with electrostatic printed copy will make this furnish more amenable to the recycling process.

The ability to recycle office waste will prove commercially advantageous and will have a significant impact on the conservation of virgin fiber resources. Although electrostatic printed waste has not reached the volume of impact printed waste commonly seen in the industry, indications are such that usage of electrostatic print is increasing steadily and that waste copies available to the recycling industry will also increase.

The present invention enhances the aggregation and subsequent removal of electrostatic toner particles through centrifugal cleaners by using specific commercially available raw materials. This can be accomplished at a wide range of pH levels (5.0 to 11.0) and will render a furnish that is virtually free of electrostatic printing ink after subsequent mechanical treatment. The invention allows for the separation of electrostatic toner particles and associated binder from pulp fibers, and causes the particles to aggregate to a critical range of size and density, which affords their most efficient removal from the pulp slurry by centrifugal cleaners.

The present invention demonstrates that combinations of solvents and surfactants with low HLBs enhance the aggregation of electrostatic toner particles, allowing removal through centrifugal cleaning and/or screening. HLB is an abbreviation for hydrophile-lipophile balance as related to the oil and water solubility of a material. A high HLB indicates that the hydrophilic portion of the molecule is dominant, while a low HLB indicates that the hydrophobic portion of the molecule is dominant. The water solubility of materials increases with increasing HLB. Traditional deinking processes utilize a wide variety of high HLB (generally greater than 10) nonionic and/or anionic surfactants or dispersants to wet and disperse ink particles to a range of size (about 0.5 to 15 microns) which allows for their most efficient subsequent removal by washing and/or froth flotation processes.

Aggregation is seen at pH levels ranging from 5.0 to 11.0 with no significant deposition of ink present on pulping equipment. The advantage of the present invention is that it allows for aggregation at an ambient pH, alleviating the need for caustic or acid tanks in the mill environment.

SUMMARY OF THE INVENTION

The present invention comprises a combination of at least two of the following components: (a) aliphatic petroleum distillates, (b) an alkylphenoxypoly-(ethyleneoxy) ethanol and (c) an ethoxylated polyoxypropylene glycol. All components are commercially available.

DETAILED DESCRIPTION OF THE INVENTION

The present inventors have discovered that the addition to an aqueous slurry of electrostatic printed wastepaper of specific solvent/surfactant blends significantly enhances the aggregation of electrostatic toner particles, allowing for their separation from fiber through centrifugal cleaning and/or screening. This aggregation takes place at pH levels ranging from 5.0 to 11.0, with no significant deposition of ink present on pulping equipment. (A pH higher than 11.0 or lower than 5.0 is also believed to be effective). The formulations allow for aggregation at an ambient pH, alleviating the need for caustic or acid tanks in the mill environment.

During initial testing, the phenomenon was termed agglomeration (i.e., a bringing together of particles, the surface area of the whole remaining the sum of each individual part). The inventors now feel that a more accurate term to describe the phenomenon is aggregation (i.e., a changing of surface area, the total surface area being less than the sum of the individual particles). Aggregation is a result of this densification, or reduction of void areas.

The aliphatic petroleum distillates (A) are saturated hydrocarbons having carbon numbers in the range of C9-C12. The chemical structures of the remaining raw materials are as follows:

Alkylphenoxypoly-(ethyleneoxy) ethanol

$$n = 1-6$$
$$x = 8-12$$

Ethoxylated Polyoxypropylene Glycol

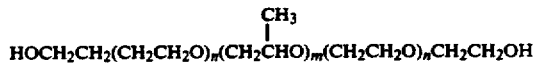

$$n = 1-45$$
$$m = 14-77$$

For the application of electrostatic toner particle aggregation, the effective hydrophile - lipophile balance of the tested surfactants is from about 0.5 to 10, preferably from about 0.5 to 5. It is believed that the effective temperature range for the aggregation of electrostatic toner particles is from about 110°-190° F.

A beaker test method was utilized to determine the impact of various raw materials on toner aggregation without the presence of fiber. This method allowed for the visual evaluation of toner configuration after treatment and permitted the particles to be sized using the Brinkmann Particle Size Analyzer. When raw materials were screened using this method, those demonstrating significant particle aggregation were advanced to the Deinking/Repulping Apparatus (the pulper) for an evaluation of performance in the presence of fiber.

The experimental procedure was as follows: Approximately 0.01 grams of toner was added to a beaker containing 100 milliliters of deionized water. Each solution of toner and water was mixed on a magnetic stirrer at a pH of 7.0, a temperature of 150° F. and a contact time of 60 minutes. About 514 parts of raw material per million parts of solution was added to the beaker. Upon completion of contact time, Particle configurations were noted, and solutions were filtered and held for size evaluation using the Brinkmann Particle Size Analyzer.

The pulper was then used to evaluate selected raw materials. This apparatus consists of a Waring blender jar with the blades reversed to provide a mixing action of the fibers. The stirring of the blender is controlled by a motor connected to a Servodyne controller. Temperature of the pulp in the blender is provided by a heating mat attached to a temperature controller. The typical furnish consistency in the laboratory pulper is 5%, and a stirring speed of 750 rpm is used to simulate the mechanical action of a hydropulper.

Electrostatic printed wood-free fiber was used as the furnish. Twenty pounds of raw material per ton of fiber were added to the pulper (5-20 pounds material/ton of fiber the preferred range, 10-20 pounds/ton most preferred) at a temperature of 150° F., a pH of 7.0, and a pulping time of 60 minutes.

DESCRIPTION OF THE PREFERRED EMBODIMENT

The laboratory results found in Table 1 demonstrate the effectiveness of the present invention. A nonylphenoxypoly (ethyleneoxy) ethanol with a molecular weight of 286 and an ethoxylated polyoxypropylene glycol with a molecular weight of 3800 are preferred components.

TABLE 1

| Pulper Results at 150° F., pH 7.0, 60 Minute Pulping Time | |
|---|---|
| Condition | Particle Size (mm$^2$) |
| Untreated Control | 0.479 |
| Aliphatic Solvent (A) | 6.162 |
| Nonylphenoxypoly-(ethyleneoxy)ethanol (B, Mol. Wt. = 286, HLB = 4.6) | 16.299 |
| Ethoxylated polyoxypropylene glycol (C, Mol. Wt. = 3800, HLB = 1.0) | 18.463 |
| Formulation (60% A:10% B:30% C) | 48.947 |

Note the effectiveness of each material (e.g., B and C) in increasing electrostatic toner particle size, as compared to the untreated control. However, the experimental formulation in its preferred ratios (60% A/ 10% B/ 30% C) showed a significant increase in particle size as compared to individual components.

Additional testing was carried out on furnish blends of various dry toner electrostatic printing copy types. The laboratory repulping/deinking apparatus was used to evaluate the performance of two component and three component material blends on electrostatic toner particle aggregation. Pulping conditions were: 150° F., 20 pounds of material per ton of fiber, 45 minutes of pulping time, and pHs of 5.0, 8.0 and 11.0. Particle size (diameter in microns) and density (grams/cc) were then determined, based on the mean of 10 particles.

A particle density greater than that of water (approximately 1 g/cc) is needed for any separation of material from water and paper fiber. For particles of equal density, the particle with a larger diameter has a greater chance of being removed with cleaning.

The performance of a cleaner may be measured in terms of its ability to remove dirt particles:

$$\% \text{ Cleaning Efficiency} = \frac{\text{Dirt Count}_{(feed)} - \text{Dirt Count}_{(accept)}}{\text{Dirt Count}_{(feed)}} \cdot 100$$

A plot of mean particle density versus percent cleaning efficiency for previous pilot cleaner runs and the resulting equation of the curve were used to predict the percent cleaning efficiency expected for the particles generated in each run.

The following results demonstrate the effectiveness of the present invention, in terms of the synergistic effect achieved by combining various components. Note that synergistic results may not always be achieved depending on changes in e.g., pH, furnish, etc. Components A, B and C are the same as used in Table 1.

TABLE 2

Effect of Treatment on Particle Size, Density and Predicted % Cleaning Efficiency at pH 5.0

| Treatment | Particle Size Diameter (microns) | Density (g/cc) | Predicted % Cleaning Efficiency |
|---|---|---|---|
| Control | 432 | 0.92 | 49.74 |
| Aliphatic Solvent (A) | 1368 | 1.02 | 77.63 |
| Nonylphenoxypoly-(ethyleneoxy) ethanol (B) | 2422 | 1.03 | 80.42 |
| Ethoxylated Polyoxypropylene Glycol (C) | 494 | 1.00 | 72.05 |
| 50% A/50% B | 1086 | 1.06 | 88.79 |
| 50% A/50% C | 2186 | 1.04 | 83.21 |
| 16.7% A/66.7% B/16.7% C | 1578 | 1.05 | 86.00 |
| 30% A/40% B/30% C | 1326 | 1.06 | 88.79 |
| 25% A/25% B/50% C | 732 | 1.08 | 94.37 |

TABLE 3

Effect of Treatment on Particle Size, Density and Predicted % Cleaning Efficiency at pH 8.0

| Treatment | Particle Size Diameter (microns) | Density (g/cc) | Predicted % Cleaning Efficiency |
|---|---|---|---|
| Control | 364 | 0.87 | 35.79 |
| Aliphatic Solvent (A) | 1513 | 1.02 | 77.63 |
| Nonylphenoxypoly-(ethyleneoxy) ethanol (B) | 2714 | 1.03 | 80.42 |
| Ethoxylated Polyoxypropylene Glycol (C) | 494 | 0.88 | 38.58 |
| 50% A/50% B | 718 | 1.08 | 94.37 |
| 50% A/50% C | 2634 | 1.06 | 88.79 |
| 50% B/50% C | 772 | 1.04 | 83.21 |
| 16.7% A/16.7% B/66.7% C | 1024 | 1.07 | 91.58 |
| 16.7% A/66.7% B/16.7% C | 1986 | 1.04 | 83.21 |
| 30% A/40% B/30% C | 1736 | 1.04 | 83.21 |
| 25% A/25% B/50% C | 646 | 1.08 | 94.37 |

TABLE 4

Effect of Treatment on Particle Size, Density and Predicted % Cleaning Efficiency at pH 11.0

| Treatment | Particle Size Diameter (microns) | Density (g/cc) | Predicted % Cleaning Efficiency |
|---|---|---|---|
| Control | 268 | 0.84 | 27.43 |
| Aliphatic Solvent (A) | 1296 | 1.02 | 77.63 |
| Nonylphenoxypoly-(ethyleneoxy) ethanol (B) | 3425 | 1.01 | 74.84 |
| Ethoxylated Polyoxypropylene Glycol (C) | 632 | 1.02 | 77.63 |
| 50% A/50% B | 893 | 1.03 | 80.42 |
| 30% A/40% B/30% C | 3384 | 1.05 | 86.01 |
| 25% A/25% B/50% C | 1331 | 1.07 | 91.59 |

(Note: A different furnish was used at pH 11.0 then at pH's of 5.0 and 8.0. Combinations of components tested with the original furnish at pH 11.0 did not produce synergistic results; the inventors feel that factors such as e.g., toner type used may have contributed to this outcome).

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. In the deinking of electrostatic printed wastepaper, a process for enhancing the aggregation of electrostatic toner particles and allowing for the separation of the particles from pulp fibers, said process comprising adding to an aqueous slurry of the electrostatic printed wastepaper an amount, sufficient for the intended purpose, of a synergistic combination of at least two of the following components the percentage range of each component based on total weight of said combination: (a) about 16–60% by weight of aliphatic petroleum distillates, (b) about 10–67% by weight of an alkylphenoxypoly-(ethyleneoxy) ethanol and (c) about 16–67% by weight of an ethoxylated polyoxypropylene glycol, the hydrophile/lipophile balance of both (b) and (c) being from about 0.5 to 10, said aggregation of electrostatic toner particles occurring at a pH of from about 5.0 to 12.0.

2. The process as recited in claim 1 wherein the aliphatic petroleum distillates are saturated hydrocarbons having carbon numbers in the range of $C_9$–$C_{12}$.

3. The process as recited in claim 1 wherein the alkylphenoxypoly-(ethyleneoxy) ethanol is a compound of the formula $$C_9H_{19}-C_6H_4O(CH_2CH_2O)_nH$$

with n from about 1 to 6.

4. The process as recited in claim 1 wherein the ethoxylated polyoxypropylene glycol is a compound of the formula $$HOCH_2CH_2(CH_2CH_2O)_n(CH_2\underset{|}{\overset{CH_3}{C}}HO)_m(CH_2CH_2O)_nCH_2CH_2OH$$

with n from about 1 to 45 and m from about 14–77.

5. The process as recited in claim 1 wherein aggregation of electrostatic toner particles occurs at a temperature of about 110° to 190° F.

6. The process as recited in claim 1 wherein the weight ratio of (a):(b):(c) is about 6:1:3.

7. The process as recited in claim 1 wherein the hydrophile/lipophile balance of both (b) and (c) is from about 0.5 to 5.

8. The process as recited in claim 1 wherein about 5 to 20 pounds of the combination per ton of fiber is added to the aqueous slurry of electrostatic printed wastepaper.

* * * * *

UNITED STATES PATENT AND TRADEMARK OFFICE
CERTIFICATE OF CORRECTION

PATENT NO. : 5,302,242
DATED : April 12, 1994
INVENTOR(S) : Sandra K. Richmann et al.

It is certified that error appears in the above-identified patent and that said Letters Patent is hereby corrected as shown below:

On the title page, items

[73] should read

Assignee: Betz PaperChem, Inc.
          Jacksonville, Fla.

[*] should read

Notice: The portion of the term of this patent subsequent to Aug. 25, 2009 has been disclaimed.

Signed and Sealed this

Sixteenth Day of January, 1996

Attest:

BRUCE LEHMAN

Attesting Officer     Commissioner of Patents and Trademarks